(12) United States Patent
Ku et al.

(10) Patent No.: US 12,309,255 B2
(45) Date of Patent: May 20, 2025

(54) PRIVACY COMPUTING METHOD BASED ON HOMOMORPHIC ENCRYPTION

(71) Applicants: Inventec (Pudong) Technology Corporation, Shanghai (CN); INVENTEC CORPORATION, Taipei (TW)

(72) Inventors: Yu Te Ku, Taipei (TW); Chih-Fan Hsu, Taipei (TW); Wei-Chao Chen, Taipei (TW); Feng-Hao Liu, Taipei (TW); Ming-Ching Chang, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 273 days.

(21) Appl. No.: 18/171,319

(22) Filed: Feb. 17, 2023

(65) Prior Publication Data

US 2024/0163075 A1 May 16, 2024

(30) Foreign Application Priority Data

Nov. 11, 2022 (CN) .......................... 202211409360.8

(51) Int. Cl.
*H04L 9/00* (2022.01)
*G06N 3/02* (2006.01)
*G06N 3/08* (2023.01)
*G06N 20/00* (2019.01)
*H04L 9/06* (2006.01)

(52) U.S. Cl.
CPC ............... *H04L 9/008* (2013.01); *G06N 3/08* (2013.01); *H04L 9/0618* (2013.01)

(58) Field of Classification Search
CPC ......... H04L 9/008; H04L 9/0618; G06N 3/08; G06N 3/02; G06N 20/00
See application file for complete search history.

(56) References Cited

U.S. PATENT DOCUMENTS

| | | | |
|---|---|---|---|
| 2017/0357749 A1* | 12/2017 | Laine | G16B 50/40 |
| 2020/0244435 A1* | 7/2020 | Shpurov | G06F 21/64 |
| 2021/0117553 A1* | 4/2021 | Shpurov | H04L 9/3263 |
| 2023/0044776 A1* | 2/2023 | Popescu | H04L 9/0894 |

OTHER PUBLICATIONS

An Efficient Encrypted Floating-Point Representation Using HEAAN and TFHE by Moon et al. (Moon), published Mar. 2020 (Year: 2020).*

* cited by examiner

*Primary Examiner* — Vu V Tran
(74) *Attorney, Agent, or Firm* — CKC & Partners Co., LLC

(57) ABSTRACT

The present disclosure provides a privacy computing method based on homomorphic encryption, which includes steps as follows. The ciphertext data is received, where the ciphertext data has a floating-point homomorphic encryption data structure, and the floating-point homomorphic encryption data structure of the ciphertext data includes the ciphertext mantissa, exponent parameter and gain parameter. The gain parameter sets the precision of the floating point corresponding to the ciphertext mantissa. The exponent parameter is adapted to multiplication or division. The artificial intelligence model performs operations on the ciphertext data to return the ciphertext result.

8 Claims, 13 Drawing Sheets

|   | 0 | 1 | 2 | 3 | 4 |
|---|---|---|---|---|---|
| 0 | -0.256965 | 0.114067 | 0.122437 | 0.261106 | 0.193293 |
| 1 | -0.412651 | -0.373184 | 0.153255 | 0.40024 | 0.162414 |
| 2 | -0.465423 | -0.210243 | 0.43314 | 0.651981 | -0.155275 |
| 3 | -0.240871 | 0.000953293 | 0.439564 | 0.161198 | -0.124581 |
| 4 | -0.058112 | -0.0910711 | 0.368993 | 0.313634 | -0.112779 |

Max:0.6519808173179626
Min:0.000953292928233966
Multiple:683.9

$$\text{Threshold} = \left\lceil \frac{\text{Max}}{R} \right\rceil = 0.08149$$

$$F(x) = \begin{cases} x & \text{if } x > \text{Threshold} \\ 0 & \text{if } x \leq \text{Threshold} \end{cases}$$

|   | 0 | 1 | 2 | 3 | 4 |
|---|---|---|---|---|---|
| 0 | -0.256965 | 0.114067 | 0.122437 | 0.261106 | 0.193293 |
| 1 | -0.412651 | -0.373184 | 0.153255 | 0.40024 | 0.162414 |
| 2 | -0.465423 | -0.210243 | 0.43314 | 0.651981 | -0.155275 |
| 3 | -0.240871 | 0 | 0.439564 | 0.161198 | -0.124581 |
| 4 | 0 | -0.0910711 | 0.368993 | 0.313634 | -0.112779 |

Max:0.6519808173179626
Min:0.0910711
Multiple:7.159

Fig. 9

PRIVACY COMPUTING METHOD BASED ON HOMOMORPHIC ENCRYPTION

CROSS-REFERENCE TO RELATED APPLICATION

This application claims priority to China Application Serial Number 202211409360.8, filed Nov. 11, 2022, which is herein incorporated by reference.

BACKGROUND

Field of Invention

The present invention relates to operation methods, and more particularly, a privacy computing method based on homomorphic encryption.

Description of Related Art

There are currently two common ways to use neural networks. (1) The data owner provides the data to the model owner for calculation, and then sends the result back to the data owner. (2) The model owner transmits the model to the data owner, and the data owner calculates the model to obtain the result. Both of these methods would expose either party to the risk of privacy leakage.

There are currently three common privacy calculation methods. (1) Confidential computing, allowing both parties to jointly calculate data and models in a trust execution environment, the hardware will allocate an isolated memory space for this environment, and reject the read of any other commands of non-neural network model to ensure privacy. (2) Secure multi-party computation, which solves the problem that a group of distrusting parties each hold secret data and jointly calculate a given function. Currently, secure multi-party computation is mainly implemented through obfuscation circuits so that two parties can calculate a certain function without knowing each other's data, which requires a huge amount of calculation and communication, and is more suitable for simple logic operations. (3) Homomorphic encryption which supports calculations on the encrypted ciphertext, and the decrypted content of the calculation result is similar to the calculation result of the plaintext.

However, the existing fully homomorphic encryption method supports the calculation of the nonlinear function of the encrypted data in the neural network model and usually uses the following two methods. (1) Approximate computing homomorphic encryption algorithm proposed by Cheon, Kim, Kim and Song (CKKS) uses Taylor expansion to approximate non-present functions. This method requires a large number of multiplication operations and cannot be fully approximated (only approximated between small cells), so it would reduce the accuracy of neural network operations. (2) Fully homomorphic encryption based on GSW (FHEW) uses GSW technology, a lookup table is constructed during the bootstrapping process to implement nonlinear functions. This method currently only supports integer encryption schemes based on learning with errors (LWE), do not support floating point operations and cannot be effectively used in neural network operations.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

According to embodiments of the present disclosure, the present disclosure provides privacy computing systems and methods based on homomorphic encryption, to solve or circumvent aforesaid problems and disadvantages in the related art.

An embodiment of the present disclosure is related to a privacy computing method based on a homomorphic encryption, and this method includes steps of: encoding and encrypting a plaintext data into a ciphertext data, where the ciphertext data has a floating-point homomorphic encryption data structure, the floating-point homomorphic encryption data structure of the ciphertext data includes a ciphertext mantissa, an exponent parameter and a gain parameter, the gain parameter sets a precision of a floating point corresponding to the ciphertext mantissa, and the exponent parameter is adapted to multiplication or division; transmitting the ciphertext data to an artificial intelligence model, so that the artificial intelligence model performs operations on the ciphertext data to return a ciphertext result; decoding and decrypting the ciphertext result into a plaintext result.

In one embodiment of the present disclosure, the plaintext data includes a real number with a decimal, and the step of encoding and encrypting the plaintext data into the ciphertext data includes: multiplying the real number with the decimal by the gain parameter to get a product, and dividing the product by the exponent parameter to obtain a plaintext mantissa; encrypting the plaintext mantissa into the ciphertext mantissa, where the ciphertext mantissa is an integer.

In one embodiment of the present disclosure, the ciphertext result has a floating-point homomorphic encryption data structure, and the floating-point homomorphic encryption data structure of the ciphertext result contains another ciphertext mantissa, another exponent parameter and another gain parameter, and the step of decoding and decrypting the ciphertext result into the plaintext result includes: decrypting the another ciphertext mantissa into a plaintext mantissa; dividing the plaintext mantissa by the other gain parameter to get a quotient, and multiplying the quotient by the another exponent parameter to obtain the plaintext result.

Another embodiment of the present disclosure is related to a privacy computing method based on a homomorphic encryption, and this method includes steps of: receiving a ciphertext data, where the ciphertext data has a floating-point homomorphic encryption data structure, the floating-point homomorphic encryption data structure of the ciphertext data includes a ciphertext mantissa, an exponent parameter and a gain parameter, the gain parameter sets a precision of a floating point corresponding to the ciphertext mantissa, the exponent parameter is adapted to multiplication or division; using an artificial intelligence model to perform operations on the ciphertext data to return a ciphertext result.

In one embodiment of the present disclosure, the ciphertext data includes a first ciphertext data and a second ciphertext data, a floating-point homomorphic encryption data structure of the first ciphertext data includes a first ciphertext mantissa, the exponent parameter and the gain parameter, a floating-point homomorphic encryption data structure of the second ciphertext data includes a second ciphertext mantissa, the exponent parameter and the gain parameter, the operations performed on the ciphertext data by the artificial intelligence model include an addition, and the addition includes: when the exponent parameter of the first ciphertext data is equal to the exponent parameter of the second ciphertext data, adding the first ciphertext mantissa of the first ciphertext data and the second ciphertext mantissa of the second ciphertext data up, so as to obtain a third ciphertext mantissa of a third ciphertext data, where a floating-point homomorphic encryption data structure of the third ciphertext data includes the third ciphertext mantissa, the exponent parameter and the gain parameter.

In one embodiment of the present disclosure, the ciphertext data includes a first ciphertext data and a second ciphertext data, a floating-point homomorphic encryption data structure of the first ciphertext data includes a first ciphertext mantissa, a first exponent parameter and the gain parameter, a floating-point homomorphic encryption data structure of the second ciphertext data includes a second ciphertext mantissa, a second exponent parameter and the gain parameter, the operations performed on the ciphertext data by the artificial intelligence model include an addition, and the addition includes: when the first exponent parameter is different from the second exponent parameter, dividing the first exponent parameter by the second exponent parameter to obtain a multiplier, multiply the first ciphertext mantissa by the multiplier to obtain a new first ciphertext mantissa, and replacing the first exponent parameter of the first ciphertext data by the second exponent parameter; adding the new first ciphertext mantissa of the first ciphertext data and the second ciphertext mantissa of the second ciphertext data up, so as to obtain a third ciphertext mantissa of a third ciphertext data, where a floating-point homomorphic encryption data structure of the third ciphertext data includes the third ciphertext mantissa, the second exponent parameter and the gain parameter.

In one embodiment of the present disclosure, the operations performed on the ciphertext data by the artificial intelligence model include a multiplication, and the multiplication includes: multiplying the exponent parameter of the ciphertext data by a multiplier to obtain a new exponent parameter of the ciphertext data.

In one embodiment of the present disclosure, the operations performed on the ciphertext data by the artificial intelligence model include: using a functional bootstrapping of the artificial intelligence model to remove a noise from the ciphertext mantissa and to perform a table lookup function to realize a nonlinear function.

In one embodiment of the present disclosure, the privacy computing method based on the homomorphic encryption further includes: after a training of the artificial intelligence model is completed, adjusting a content of a lookup table in the artificial intelligence model and an encoder of an extraction in functional bootstrapping to avoid overflow during the operations.

In one embodiment of the present disclosure, the privacy computing method based on the homomorphic encryption further includes: after a training of the artificial intelligence model is completed, searching layers in the artificial intelligence model one by one for a value adapted to zero the weight of neuron as a threshold value; setting the weight of the neuron of the artificial intelligence model that is less than the threshold value to zero.

In view of the above, the privacy computing method based on the homomorphic encryption of the present disclosure can run an artificial intelligence model (e.g., a neural network) on encrypted data to obtain accurate answers. Different from plaintext calculations, the present disclosure does not leak the privacy of data owners and model owners. Compared with confidential computing, the present disclosure does not require a trusted execution environment supported by special hardware. Compared with secure multi-party computation, the present disclosure can perform complex calculations without a lot of interaction between the model owner and the data owner. Compared with conventional homomorphic encryption schemes, the present disclosure improves the efficiency and accuracy of homomorphic encryption in the artificial intelligence model (e.g., a neural network model) operations.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows:

FIG. 9 is a flow chart of a neuron weight adjustment module according to one embodiment of the present disclosure;

DETAILED DESCRIPTION

Figure 1:
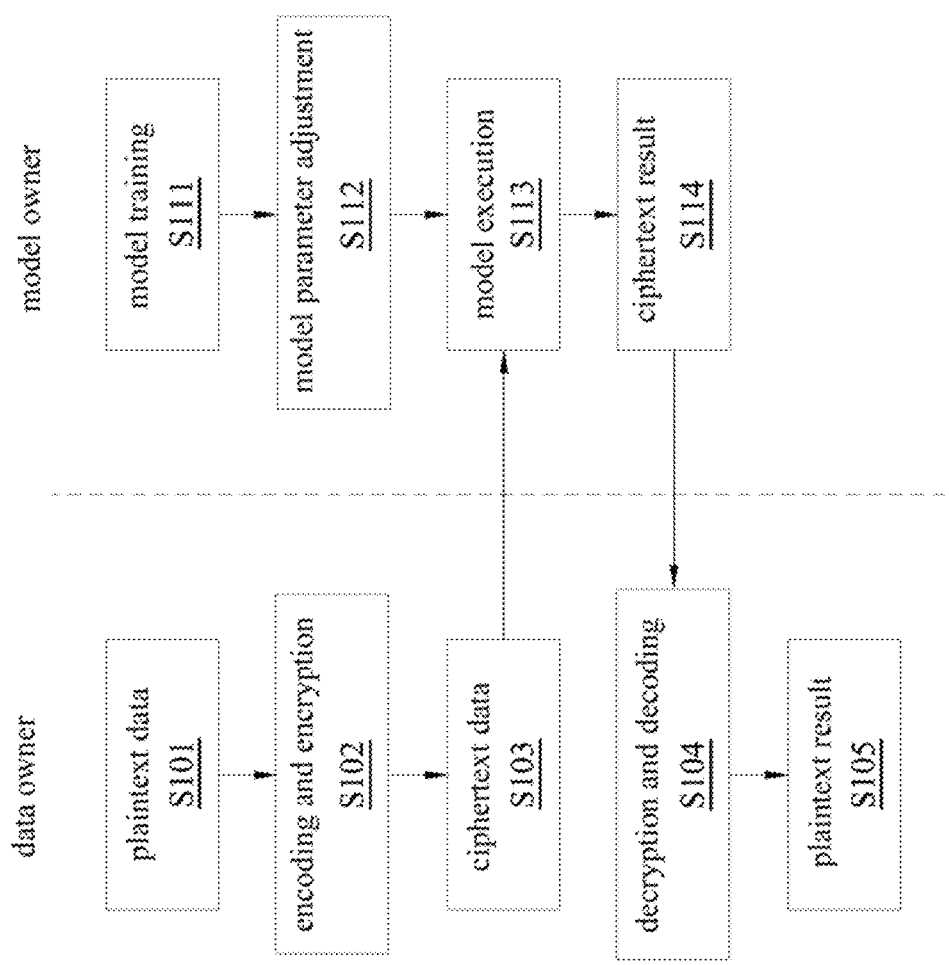
FIG. 1 is a flow chart of a privacy computing method based on a homomorphic encryption according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, in one aspect, the present disclosure is directed to a privacy computing method based on the homomorphic encryption. This method may be applied to various operations and may be applicable or readily adaptable to all technologies. Accordingly, the privacy computing method based on the homomorphic encryption has advantages. Herewith the privacy computing method based on the homomorphic encryption is described below with FIG. 1.

In some embodiments, the subject disclosure provides the privacy computing method based on the homomorphic encryption in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

FIG. 1 is a flow chart of the privacy computing method based on the homomorphic encryption according to some embodiments of the present disclosure. As shown in FIG. 1, the privacy computing method based on the homomorphic encryption includes steps S101-S105 and S111-S114. It should be noted that, as could be appreciated by persons having ordinary skill in the art, for the steps described in the present embodiment, the sequence in which these steps is performed, unless explicitly stated otherwise, can be altered depending on actual needs; in certain cases, all or some of these steps can be performed concurrently.

In step S101, the data owner computer device provides a plaintext data. In step S102, the data owner computer device executes the encoding and encryption module to encode and encrypt the plaintext data into ciphertext data, and the ciphertext data has a floating-point homomorphic encryption data structure. In step S103, the data owner computer device transmits the ciphertext data to the model owner computer device. In step S113, the model owner computer device receives the ciphertext data, and executes an artificial intelligence model (e.g., a neural network model) to performs operations on the ciphertext data to obtain a ciphertext result; in some embodiments, the artificial intelligence model executes a ciphertext-ciphertext addition module, a ciphertext-plaintext multiplication module, and a ciphertext lookup table module. In step S114, the model owner computer device returns the ciphertext result to the data owner computer device. In step S104, the data owner computer device executes a decryption and decoding module to decode and decrypt the ciphertext result into a plaintext result. In step S105, the data owner computer device stores the plaintext result.

On the other hand, in step S111, the model owner computer device trains the artificial intelligence model in advance. After the training of the artificial intelligence model is completed, in step S112, the model owner computer device executes a functional bootstrapping parameter automatic adjustment module to adjust the content of the lookup table in the artificial intelligence model and an encoder of extraction in a functional bootstrapping to avoid overflow during the operations, which will be further described in the following embodiments. The model owner computer device executes the neuron weight adjustment threshold value searching module to search layers in the artificial intelligence model one by one for a value adapted to zero the weight of neuron as a threshold value, and executes a neuron weight adjustment module to set the weight of the neuron of the artificial intelligence model that is less than the threshold value to zero, so as to reduce the error caused by the operations.

Figure 2:
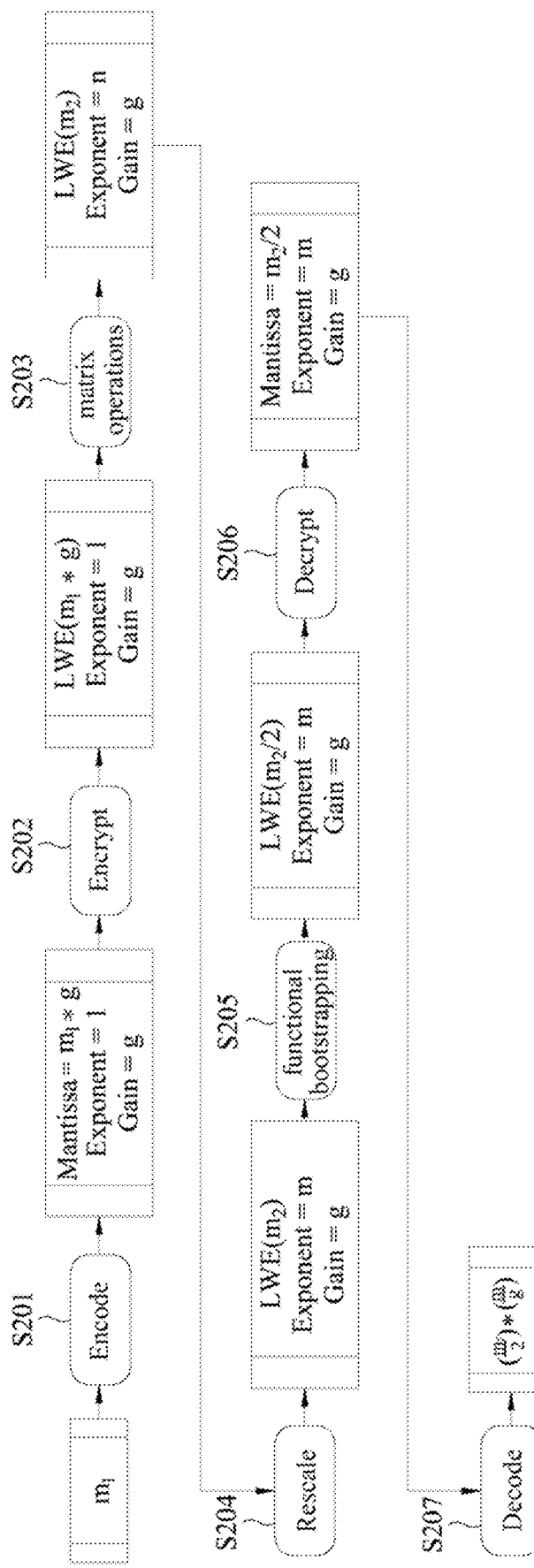
FIG. 2 is a flow chart of the privacy computing method based on the homomorphic encryption according to another embodiment of the present disclosure.

FIG. 2 is a flow chart of the privacy computing method based on the homomorphic encryption according to another embodiment of the present disclosure. As shown in FIG. 2, the privacy computing method based on the homomorphic encryption includes steps S201-S207. It should be noted that, as could be appreciated by persons having ordinary skill in the art, for the steps described in the present embodiment, the sequence in which these steps is performed, unless explicitly stated otherwise, can be altered depending on actual needs; in certain cases, all or some of these steps can be performed concurrently.

In step S201, plaintext data $m_1$ is encoded, so that plaintext data m1 is multiplied by gain parameter Gain (e.g., g) to get a product, and the product is divided by exponent parameter Exponent (e.g., 1) to obtain a mantissa (Mantissa) (e.g., plaintext mantissa is $m_1 * g$). In step S202, the mantissa (Mantissa) is encrypted into ciphertext mantissa LWE ($m_1 * g$) (for example: ciphertext mantissa based on LWE). In some embodiments, the floating-point homomorphic encryption data structure of ciphertext data includes the ciphertext mantissa LWE($m_1 * g$), the exponent parameter (Exponent) and gain parameter (Gain), the gain parameter (Gain) sets the precision of the floating point (decimal point) corresponding to ciphertext mantissa LWE($m_1 * g$), and the exponent parameter (Exponent) that can be preset to 1 is adopted to multiplication or division.

In step S203, the artificial intelligence model performs matrix operations (e.g., addition, multiplication and so on) on the ciphertext data, to obtain ciphertext mantissa LWE ($m_2$) and exponent parameter (Exponent) is n, and gain parameter (Gain) is still g. In step S204, the exponent parameter (Exponent) is rescaled (e.g., a division), so that the exponent parameter (Exponent) is m.

In step S205, the functional bootstrapping of the artificial intelligence model is used to remove a noise from the ciphertext mantissa LWE($m_2$) and to perform a table lookup function to realize a nonlinear function, thereby obtaining the ciphertext mantissa LWE($m_2/2$) of the ciphertext result. In some embodiments, the floating-point homomorphic encryption data structure of ciphertext data includes the ciphertext mantissa LWE($m_2/2$), the exponent parameter (Exponent) (e.g., m) and the gain parameter (Gain) (e.g., g).

In step S206, the ciphertext result is decrypted, so as to decrypt the ciphertext mantissa LWE ($m_2/2$) into the mantissa (Mantissa) (e.g., a plaintext mantissa is $m_2/2$). In step S207, the decoding is to divide mantissa (Mantissa) (e.g., the plaintext mantissa is $m_2/2$) by the gain parameter (e.g., m)

to get a quotient and to multiply the quotient by the exponent parameter (Exponent) (e.g., g) to obtain plaintext result $(m_2/2)*(m/g)$.

Figure 3:
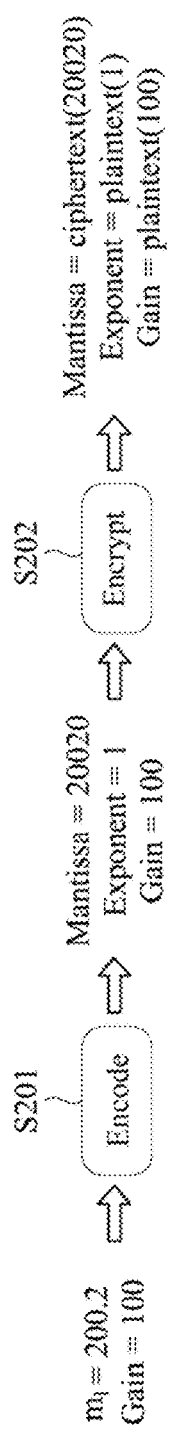
FIG. 3 is a flow chart of an encoding and encryption module according to one embodiment of the present disclosure.

FIG. 3 is a flow chart of an encoding and encryption module according to one embodiment of the present disclosure. As shown in FIG. 3, plaintext datam1 includes a real number with a decimal (e.g., 200.2). In step S201, the plaintext data $m_1$ (i.e., the real number with the decimal) is multiplied by the gain parameter (Gain) to get a product, and the product is divided by the exponent parameter (Exponent) to obtain the mantissa (Mantissa) (e.g., the plaintext mantissa is 20020). In step S202, the mantissa (Mantissa) is encrypted into ciphertext mantissa, such as ciphertext (20020), the ciphertext mantissa is an integer, the gain parameter (Gain) is still the plaintext gain parameter plaintext(100), and the exponent parameter (Exponent) is still the plaintext exponent parameter plaintext(1).

Figure 4:
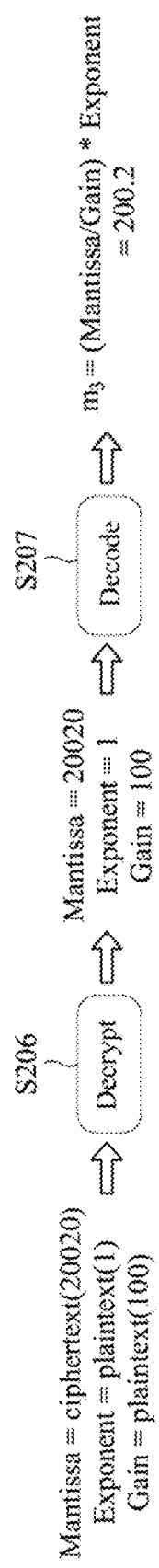
FIG. 4 is a flow chart of an decryption and decoding module according to one embodiment of the present disclosure.

FIG. 4 is a flow chart of an decryption and decoding module according to one embodiment of the present disclosure. As shown in FIG. 4, the floating-point homomorphic encryption data structure of ciphertext result includes the ciphertext mantissa ciphertext(20020), the exponent parameter (Exponent) (e.g., the plaintext exponent parameter plaintext(1)) and the gain parameter (Gain) (e.g., plaintext gain parameter plaintext(100)). In step S206, the ciphertext mantissa ciphertext (20020) is decrypted into plaintext mantissa (e.g., 200.2). In step S207, the mantissa (Mantissa) (e.g., the plaintext mantissa is 200.2) is divided by the gain parameter (Gain) (e.g., 100) to get a quotient, and the quotient is multiplied by the exponent parameter (Exponent) (e.g., 1) to obtain the plaintext result $m_3$ (e.g., 200.2).

Figure 5:
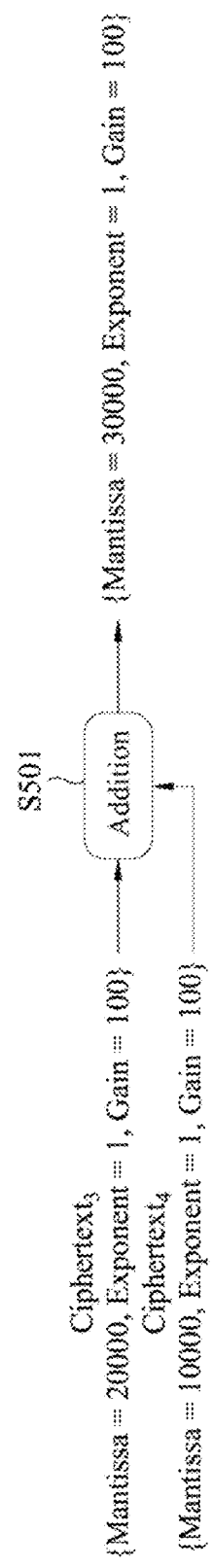
FIG. 5 is a flow chart of a ciphertext-ciphertext addition module according to one embodiment of the present disclosure.

FIG. 5 is a flow chart of a ciphertext-ciphertext addition module according to one embodiment of the present disclosure. As shown in FIG. 5, the ciphertext data includes a first ciphertext data $Ciphertext_3$ and a second ciphertext data $Ciphertext_4$. The floating-point homomorphic encryption data structure of the first ciphertext data $Ciphertext_3$ includes mantissa (Mantissa) (e.g., a first ciphertext mantissa with a value of 20000), the exponent parameter (Exponent) and the gain parameter (Gain). The floating-point homomorphic encryption data structure of the first ciphertext data $Ciphertext_4$ includes mantissa (Mantissa) (e.g., a second ciphertext mantissa with a value of 10000), the exponent parameter (Exponent) (e.g., 1) and the gain parameter (Gain) (e.g., 100). In the addition of step S501, when the exponent parameter (Exponent) of the first ciphertext data $Ciphertext_3$ is equal to the exponent parameter (Exponent) of the second ciphertext data $Ciphertext_4$, the first ciphertext mantissa (e.g., 20000) of first ciphertext data $Ciphertext_3$ and the second ciphertext (e.g., 10000) of the second ciphertext data $Ciphertext_4$ are added up, so as to obtain the third ciphertext mantissa (e.g., 30000) of the third ciphertext data. The floating-point homomorphic encryption data structure of the third ciphertext data includes the third ciphertext mantissa (e.g., 30000), the exponent parameter (Exponent) and the gain parameter (Gain).

Figure 6:
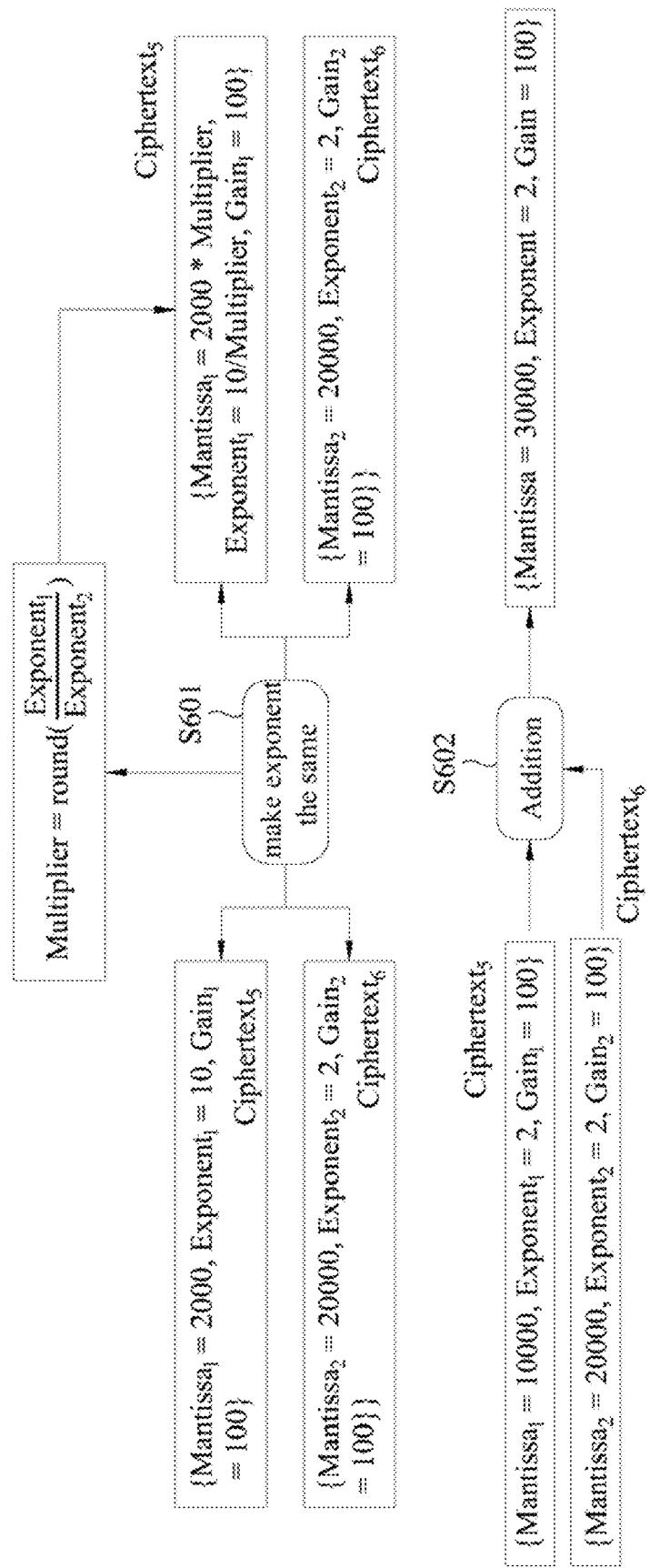
FIG. 6 is a flow chart of the ciphertext-ciphertext addition module according to another embodiment of the present disclosure.

FIG. 6 is a flow chart of the ciphertext-ciphertext addition module according to another embodiment of the present disclosure. As shown in FIG. 6, the ciphertext data includes a first ciphertext data$Ciphertext_5$ and a second ciphertext data$Ciphertext_6$. The floating-point homomorphic encryption data structure of the first ciphertext data$Ciphertext_5$ includes a first ciphertext mantissa $Mantissa_1$ (e.g., 2000), a first exponent parameter $Exponent_1$ (e.g., 10) and a gain parameter $Gain_1$ (e.g., 100). The floating-point homomorphic encryption data structure of the second ciphertext data$Ciphertext_6$ includes a second ciphertext mantissa $Mantissa_2$ (e.g., 20000), a second exponent parameter $Exponent_2$ (e.g., 2) and a gain parameter $Gain_2$ (e.g., 100). When the first exponent parameter $Exponent_1$ is different from the second exponent parameter $Exponent_2$, step S601 is to make the exponent parameters the same. In some embodiments, the first exponent parameter $Exponent_1$ is divided by the second exponent parameter $Exponent_2$ to obtain a multiplier (Multiplier); for example, Multiplier round($Exponent_1$/$Exponent_2$), where round( ) can be, for example, a function that rounds an integer. Then, the first ciphertext mantissa $Mantissa_1$ (e.g., 2000) is multiplied by the multiplier (Multiplier) to get a new first ciphertext mantissa $Mantissa_1$ (e.g., 10000), the first exponent parameter $Exponent_1$ (e.g., 10) of the first ciphertext data is replaced by the second exponent parameter $Exponent_2$ (e.g., 2); for example, the first exponent parameter $Exponent_1$ (e.g., 10) is divided by the multiplier (Multiplier) to obtain the second exponent parameter $Exponent_2$ (e.g., 2).

In the addition of step S602, the new first ciphertext mantissa $Mantissa_1$ (e.g., 10000) of the first ciphertext data$Ciphertext_5$ and the second ciphertext mantissa $Mantissa_2$ (e.g., 20000) of the second ciphertext data $Ciphertext_6$ are added up, so as to obtain the mantissa (Mantissa) (e.g., the third ciphertext mantissa with a value of 30000) of the third ciphertext data. The floating-point homomorphic encryption data structure of the third ciphertext data includes the third ciphertext mantissa (e.g., 30000), the exponent parameter (Exponent) (e.g., 2) and the gain parameter (Gain) (e.g., 100).

Figure 7:
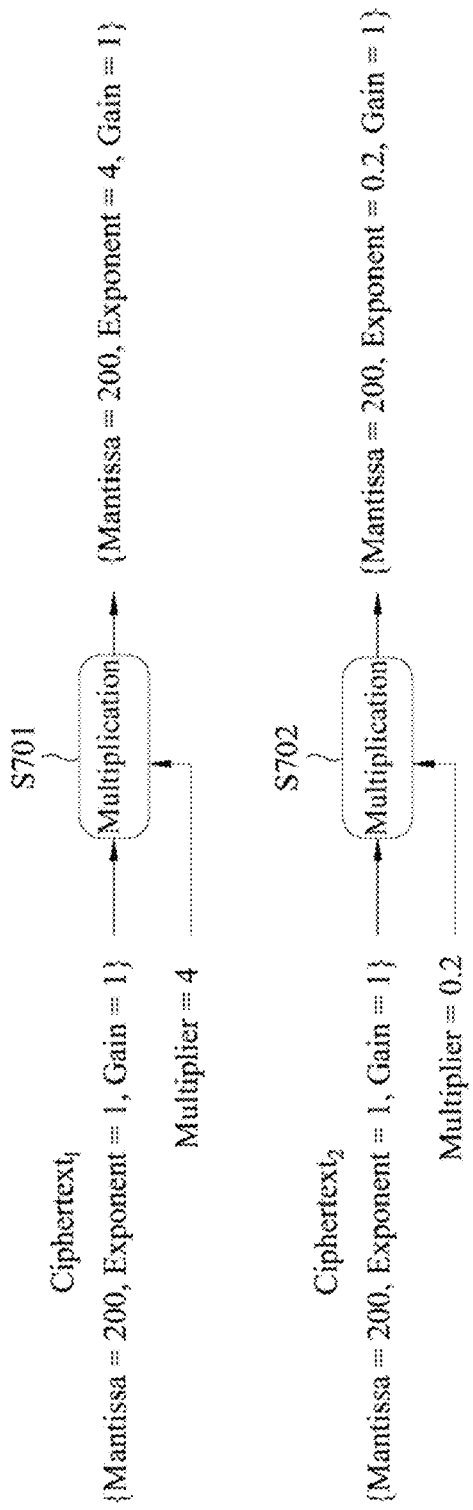
FIG. 7 is a flow chart of a ciphertext-plaintext multiplication module according to one embodiment of the present disclosure.

FIG. 7 is a flow chart of a ciphertext-plaintext multiplication module according to one embodiment of the present disclosure. In step S701, the exponent parameter (Exponent) (e.g., 1) of the ciphertext data $Ciphertext_1$ is multiplied by the multiplier (Multiplier) (e.g., 4) to obtain a new exponent parameter Exponent (e.g., 4) of the ciphertext data.

In step S702, the exponent parameter (Exponent) (e.g., 1) of the ciphertext data $Ciphertext_2$ is multiplied by the multiplier (Multiplier) (e.g., 0.2) to obtain the new exponent parameter Exponent (e.g., 0.2) of the ciphertext data. Because the multiplier (Multiplier) (e.g., 0.2) is a positive number less than 1, so the multiplication operation of step S702 can also be optionally regarded as a division, but the present disclosure is not limited thereto. Since the multiplication operations of steps S701 and S702 do not need to operate on ciphertext (e.g., the ciphertext mantissa with a value of 200), so that the operation time can be saved greatly.

Figure 8:
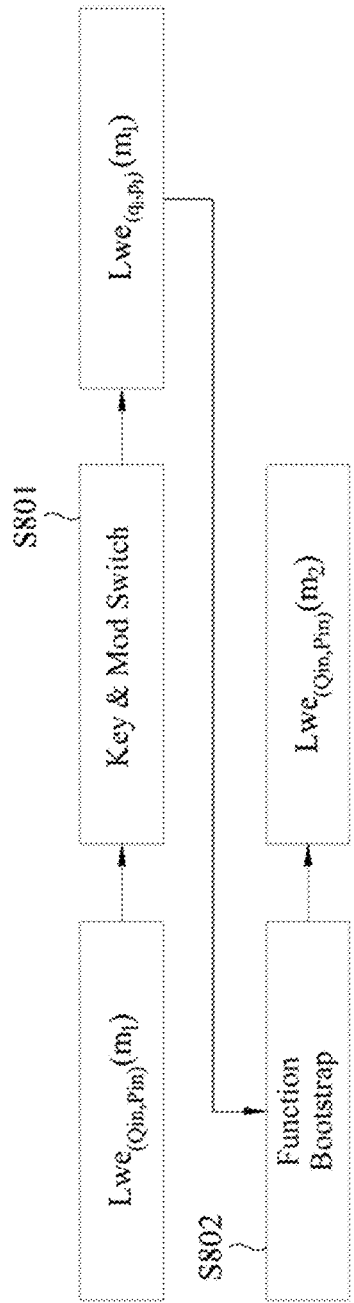
FIG. 8 is a flow chart of a ciphertext lookup table module according to one embodiment of the present disclosure.

FIG. 8 is a flow chart of a ciphertext lookup table module according to one embodiment of the present disclosure. In step S801, the ciphertext mantissa $Lwe_{(Qin,Pin)}(m_1)$ with a relatively large data dimension is obtained through the key and mod switch to obtain a ciphertext mantissa $Lwe_{(q1,p1)}(m_1)$ with a relatively small data dimension, where q1 and p1 can be range related parameters, for example: q1 can represent a modulus, and p1 can represent an information space parameter, but the present disclosure is not limited thereto. In step S802, a functional bootstrapping of the artificial intelligence model used to remove a noise from the ciphertext mantissa $Lwe_{(q1,p1)}(m_1)$ and to perform a table lookup function to realize a nonlinear function, so as to obtain ciphertext mantissa $Lwe_{(Qin,Pin)}(m_2)$.

FIG. 9 is a flow chart of a neuron weight adjustment module according to one embodiment of the present disclosure. As shown in FIG. 9, after the training of the artificial intelligence model is completed, the multiple (Multiple) obtained by dividing the maximum value Max by the minimum value Min in the table is 683.9. Since the multiple (Multiple) exceeds the preset range (e.g., the range of empirical values), the artificial intelligence model zero the weights of the neurons less than threshold value (Threshold), so as to remove noise. In some embodiments, as shown in FIG. 9, for example, the maximum value Max is divided by 8 to obtain the threshold value (Threshold). After the weight adjustment is performed by the neuron weight adjustment module F(x), the maximum value Max remains unchanged, and the maximum value Max divided by the new minimum value to obtain the multiple (Multiple) that is 7.159, which falls within the above preset range.

Figure 10:
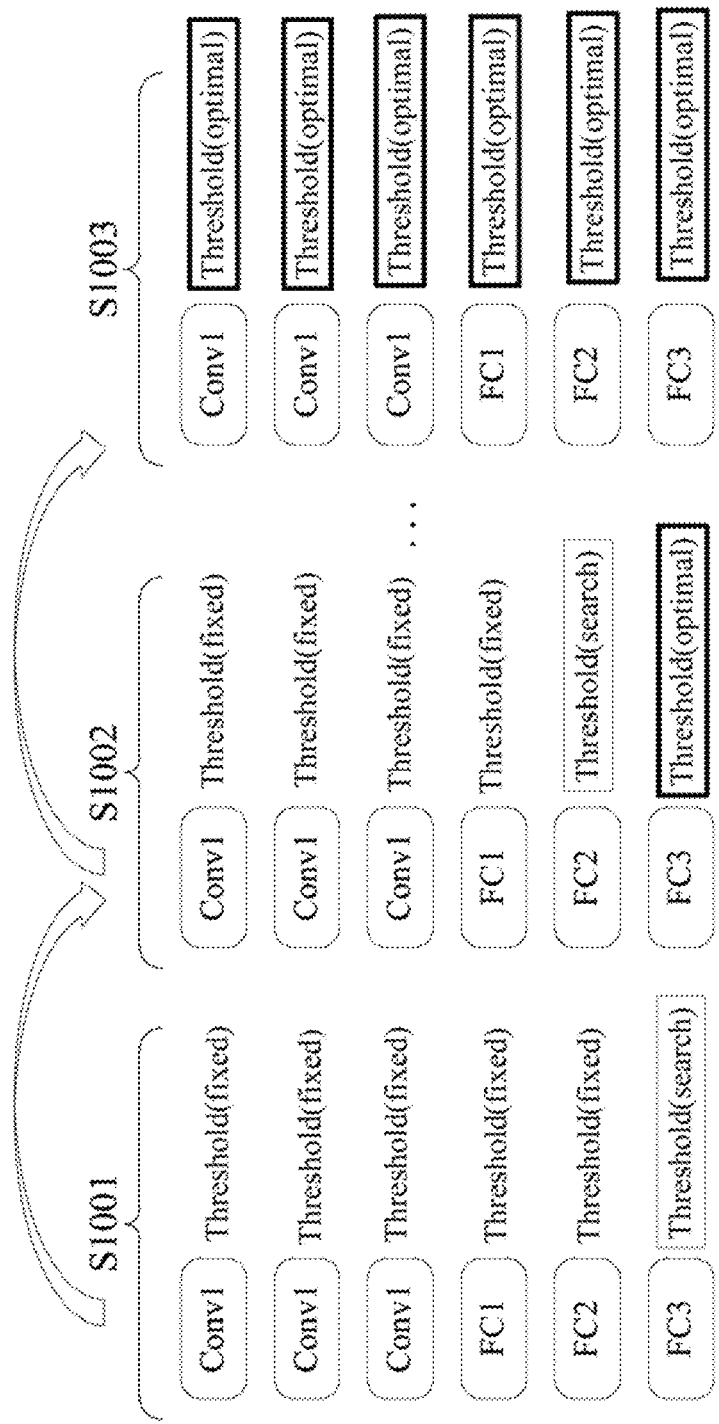
FIG. 10 is a flow chart of a neuron weight adjustment threshold value searching module according to one embodiment of the present disclosure.
Figure 11:
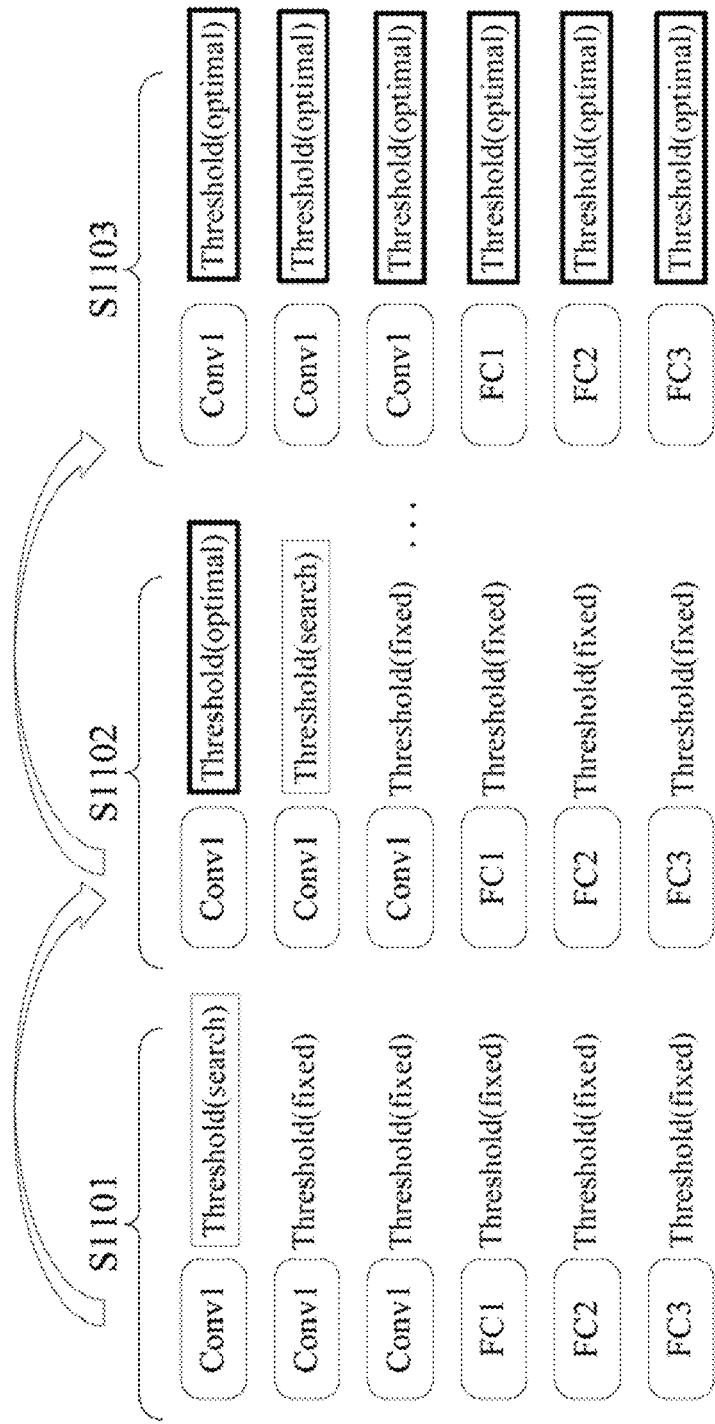
FIG. 11 is a flow chart of the neuron weight adjustment threshold value searching module according to another embodiment of the present disclosure.

Regarding the determination method of threshold value (Threshold), refer to FIG. 10 and FIG. 11. After the training of the artificial intelligence model is completed, layers in the artificial intelligence model is searched one by one for a value adapted to zero the weight of neuron as a threshold value.

FIG. 10 is a flow chart of a neuron weight adjustment threshold value searching module according to one embodiment of the present disclosure. As shown in FIG. 10, in steps S1001, S1002, and S1003, searching from the back fully connected layers FC3, FC2, and FC1 to the front convolutional layer Conv1, the above-mentioned maximum value Max divided by different magnifications in the preset range to obtain different values are used, for example, to search layer by layer for a value (e.g., Max/8) converted from the magnification (e.g., 8) adapted to zero the weight of the neuron, and this value can be a threshold value; for example, the threshold value that makes the optimal accuracy of the artificial intelligence model is selected, but the present disclosure is not limited thereto. Since the previous layers can be determined by empirical rules in practice and the latter layers have a greater impact on the accuracy, the embodiment in FIG. 10 searches from the back to the front.

FIG. 11 is a flow chart of the neuron weight adjustment threshold value searching module according to another embodiment of the present disclosure. Compared with the embodiment in FIG. 10, as shown in FIG. 11, in steps S1101, S1102, and S1103, searching from the front convolutional layer Conv1 to the back fully connected layers FC1, FC2, and FC3, the above-mentioned maximum value Max divided by different magnifications in the preset range to obtain different values are used, for example, to search layer by layer for a value converted from the magnification adapted to zero the weight of the neuron, and this value can be a threshold value; for example, the threshold value that makes the optimal accuracy of the artificial intelligence model is selected, but the present disclosure is not limited thereto. Since the previous layers may affect the subsequent output, the embodiment in FIG. 11 searches from front to back.

Figure 12:
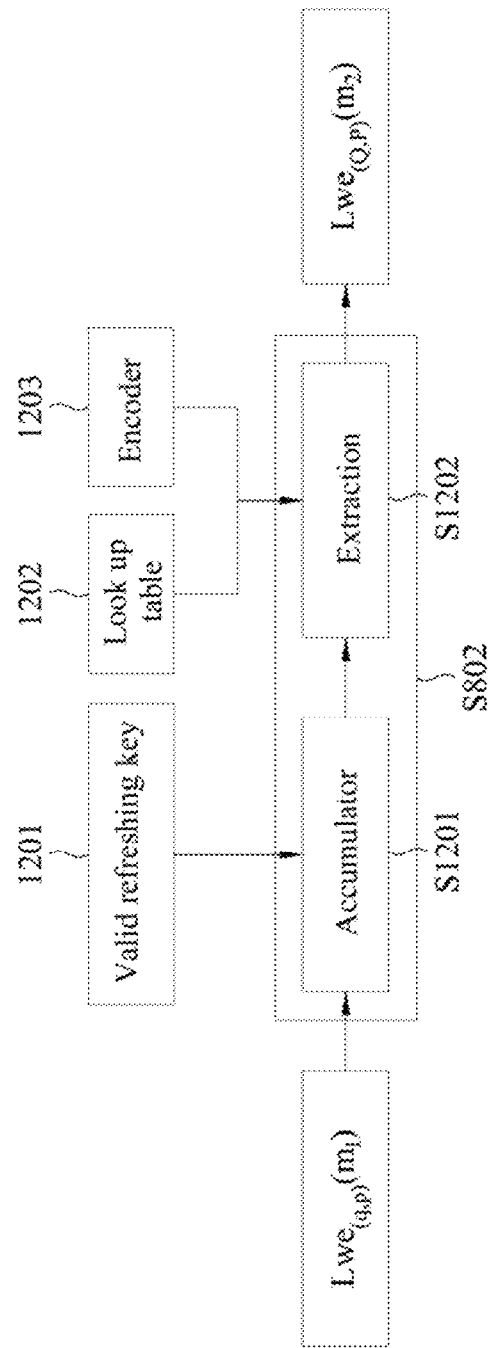
FIG. 12 is a flow chart of a functional bootstrapping in the ciphertext lookup table module according to one embodiment of the present disclosure.

FIG. 12 is a flow chart of a functional bootstrapping in the ciphertext lookup table module according to one embodiment of the present disclosure. Regarding the functional bootstrapping of step S802, as shown in FIG. 12, ciphertext mantissa $Lwe_{(q,p)}(m_1)$ is accumulated through the accumulator of step S1201 using the valid refreshing key 1201 (e.g., an operation like decoding) to benefit step S1202 to use the lookup table 1202 to find the corresponding value. Step S1202 is to adjust a content of a lookup table in the artificial intelligence model and an encoder 1203 of an extraction in functional bootstrapping to avoid overflow during the operations, thereby obtaining the ciphertext mantissa $Lwe_{(Q,P)}(m_2)$. In some embodiments, for example, the encoder 1203 rescales the magnification of the ciphertext mantissa (e.g., dividing the ciphertext mantissa by 2), so as to prevent the data calculated by the lookup table 1202 from exceeding the range defined by the range related parameters p and q, but the present disclosure is not limited thereto.

Figure 13:
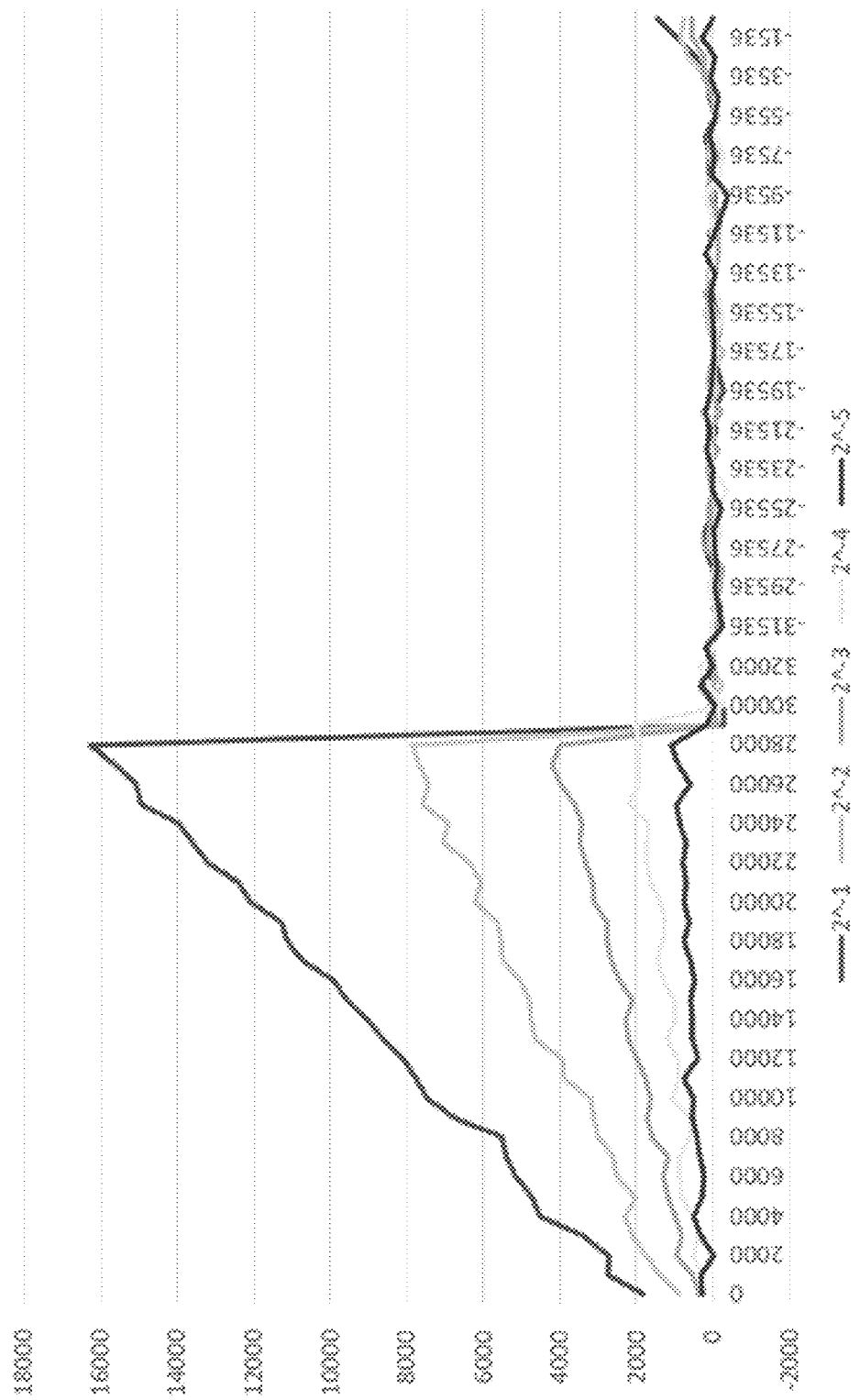
FIG. 13 is a diagram of a selection example of a lookup table and an encoder in the ciphertext lookup table module according to one embodiment of the present disclosure.

FIG. 13 is a diagram of a selection example of the lookup table 1202 and the encoder 1203 in the ciphertext lookup table module according to one embodiment of the present disclosure. In FIG. 13, the ordinate corresponds to ciphertext mantissa $Lwe(Q,P)(m2)$, and the abscissa corresponds to ciphertext mantissa $Lwe(q,p)(m1)$. FIG. 13 shows the zoom results under different zoom magnifications, and the values that are not within the predetermined range can be reset to zero.

Figure 14:
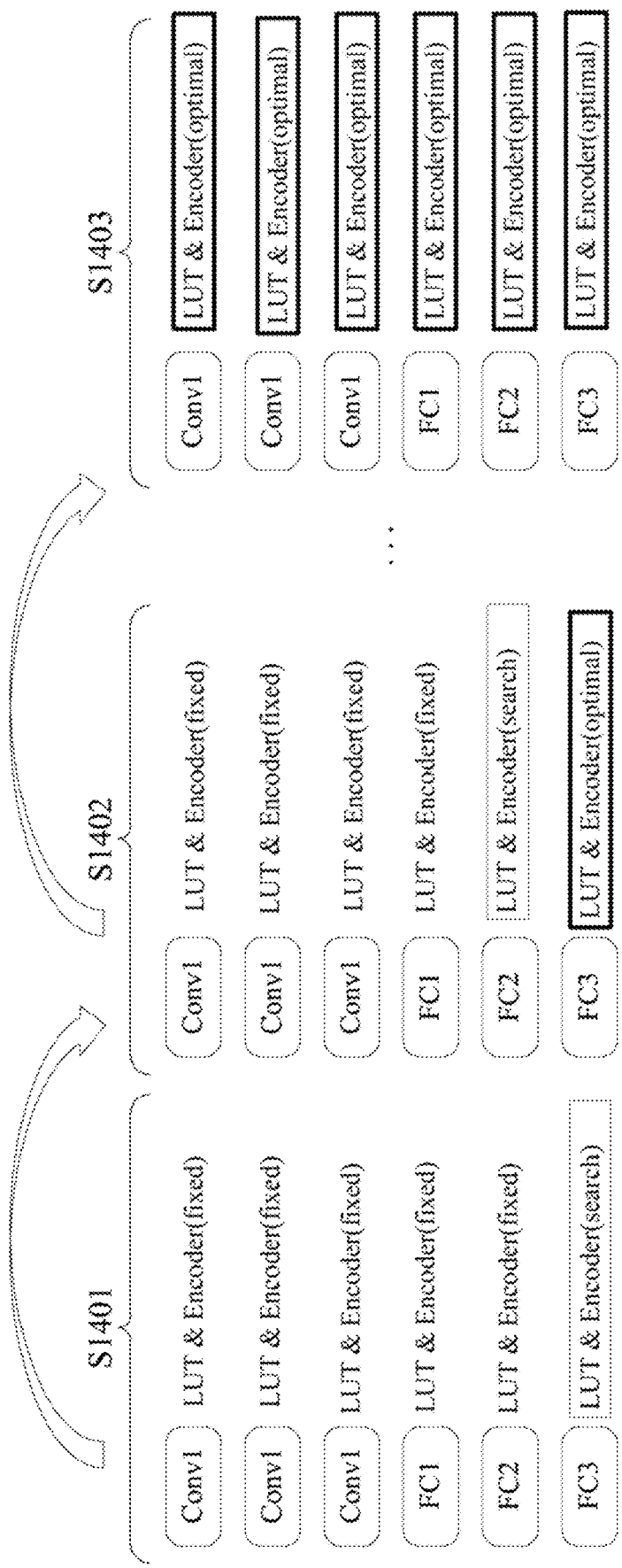
FIG. 14 is a flow chart of a functional bootstrapping parameter automatic adjustment module.
Figure 15:
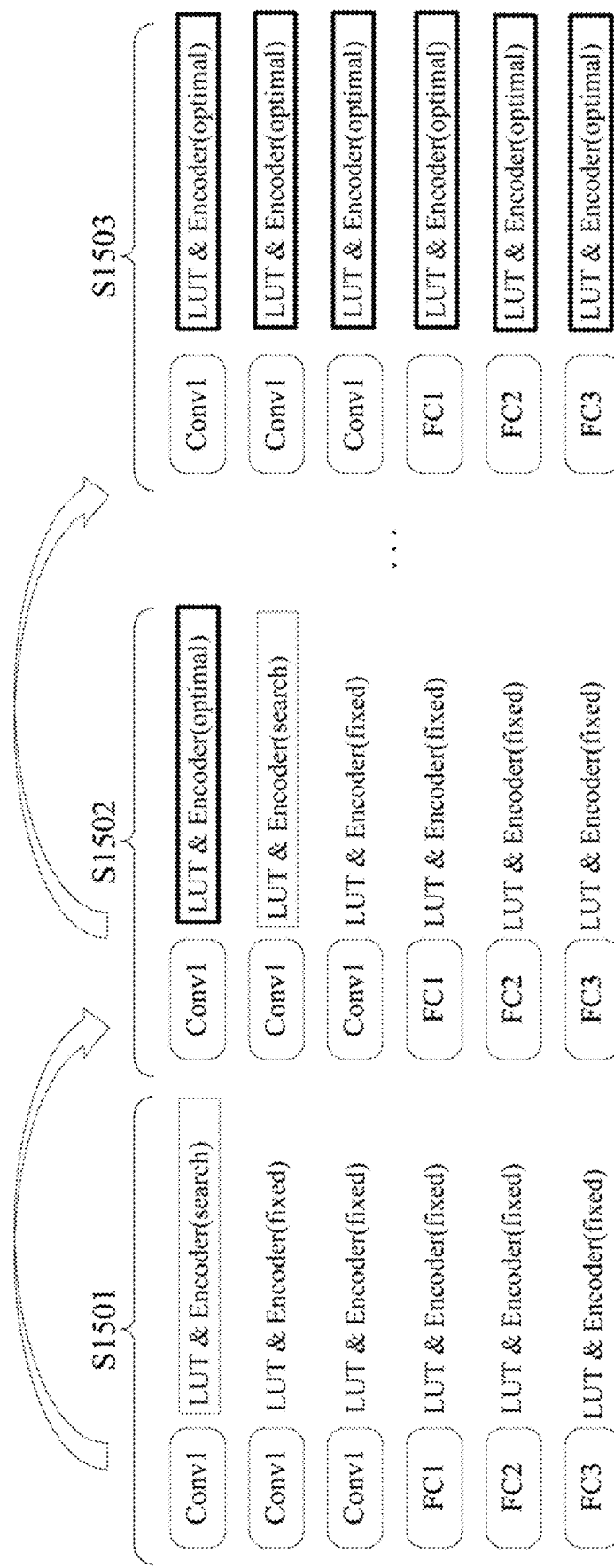
FIG. 15 is a flow chart of a functional bootstrapping parameter automatic adjustment module according to another embodiment of the present disclosure.

Regarding the adjustment method of lookup table 1202 and encoder 1203, refer to FIG. 14 and FIG. 15. FIG. 14 is a flow chart of a functional bootstrapping parameter automatic adjustment module. FIG. 15 is a flow chart of a functional bootstrapping parameter automatic adjustment module according to another embodiment of the present disclosure.

As shown in FIG. 14, in steps S1401, S1402, and S1403, searching from the back fully connected layers FC3, FC2, and FC1 to the front convolutional layer Conv1, different values are used to layer by layer search for a parameter that is most suitable for the lookup table 1202 and the encoder 1203, such as selecting the scaling parameters for functional bootstrapping without overflow and with the best accuracy, but the present disclosure not limited thereto. Since the previous layers can be determined by empirical rules in practice and the latter layers have a greater impact on the accuracy, the embodiment in FIG. 14 searches from the back to the front.

On the other hand, as shown in FIG. 15, in steps S1501, S1502, and S1503, searching from the front convolutional layer Conv1 to the back fully connected layers FC1, FC2, and FC3, different values are used to layer by layer search for a parameter that is most suitable for the lookup table 1202 and the encoder 1203, such as selecting the scaling parameters for functional bootstrapping without overflow and with the best accuracy, but the present disclosure not limited thereto. Since the previous layers may affect the subsequent output, the embodiment in FIG. 15 searches from front to back.

In some embodiments, the present disclosure provides an adjustable precision accumulator; by adjusting the threshold multiplier, the accuracy of accumulation can be controlled, which can reduce the space used for LEW ciphertext. For example, before adding a plurality of ciphertext data together, in which the maximum exponent parameter is divided by a predetermined threshold multiplier to get a quotient; when an exponent parameter of a ciphertext data is less than the quotient, this ciphertext data is omitted from the plurality of ciphertext data, so that the remaining ciphertext data can be added up, thereby reduce the space.

Figure 16:
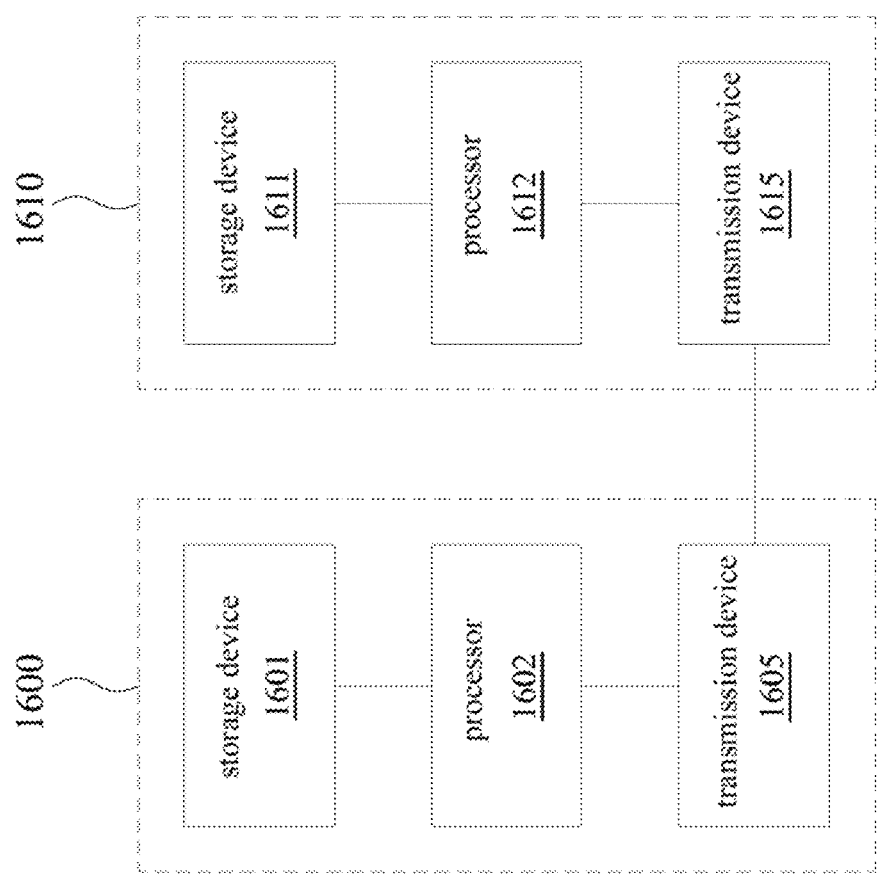
FIG. 16 is a block diagram of a privacy computing system based on the homomorphic encryption according to one embodiment of the present disclosure.

FIG. 16 is a block diagram of a privacy computing system based on the homomorphic encryption according to one embodiment of the present disclosure. The privacy computing system based on homomorphic encryption can execute the aforementioned privacy computing method based on the homomorphic encryption. As shown in FIG. 16, the privacy computing system based on the homomorphic encryption includes a data owner computer device 1600 and a model owner computer device 1610.

The data owner computer device 1600 includes a storage device 1601, a processor 1602 and a transmission device 1605; the model owner computer device 1610 includes a storage device 1611, a processor 1612 and a transmission device 1615. For example, the storage devices 1601 and 1611 can be hard disks, flash storage devices or other storage media, the processors 1602 and 1612 can be central processors, controllers or other circuits, the transmission devices 1605 and 1615 can be transmission interfaces, transmission lines, networks devices, communication devices or other transmission media.

Regarding the architecture of data owner computer device 1600, the storage device 1601 is electrically connected to the processor 1602, and the processor 1602 is electrically connected to the transmission device 1605; regarding the architecture of model owner computer device 1610, the storage device 1611 is electrically connected to the processor 1612, and the processor 1612 is electrically connected to the transmission device 1612. It should be understood that, in the descriptions of the embodiments and the scope of the patent application, the description of "electrical connection" may generally refer to the indirect electrical coupling of one element to another element through other elements, or the direct electrical coupling of an element without passing through other elements.

In use, the storage device 1601 stores the plaintext data, the encoding and encryption module, the ciphertext data having the floating-point homomorphic encryption data structure, the decryption and decoding module, and the plaintext result, and the processor 1602 can execute the encoding and encryption module and the decryption and decoding module. The storage device 1611 stores the artificial intelligence model, the functional bootstrapping parameter automatic adjustment module, the neuron weight adjustment module, the neuron weight adjustment threshold value searching module, the ciphertext-ciphertext addition module, the ciphertext-plaintext multiplication module, the ciphertext lookup table module and the ciphertext result having floating-point homomorphic encryption data structure, and the processor 1612 can execute the artificial intelligence model, the functional bootstrapping parameter automatic adjustment module, the neuron weight adjustment module, the neuron weight adjustment threshold value searching module, the ciphertext-ciphertext addition module, the ciphertext-plaintext multiplication module and the ciphertext lookup table module. Data transmission can be performed between the transmission device 1605 and the transmission device 1615.

In view of the above, the privacy computing method based on the homomorphic encryption of the present disclosure can run an artificial intelligence model (e.g., a neural network) on encrypted data to obtain accurate answers. Different from plaintext calculations, the present disclosure does not leak the privacy of data owners and model owners. Compared with confidential computing, the present disclosure does not require a trusted execution environment supported by special hardware. Compared with secure multi-party computation, the present disclosure can perform complex calculations without a lot of interaction between the model owner and the data owner. Compared with conventional homomorphic encryption schemes, the present disclosure improves the efficiency and accuracy of homomorphic encryption in the artificial intelligence model (e.g., a neural network model) operations.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A privacy computing method based on a homomorphic encryption, comprising steps of:
   encoding and encrypting a plaintext data into a ciphertext data, wherein the ciphertext data has a floating-point homomorphic encryption data structure, the floating-point homomorphic encryption data structure of the ciphertext data comprises a ciphertext mantissa, an exponent parameter and a gain parameter, the gain parameter sets a precision of a floating point corresponding to the ciphertext mantissa, and the exponent parameter is adapted to multiplication or division;
   transmitting the ciphertext data to an artificial intelligence model, so that the artificial intelligence model performs operations on the ciphertext data to return a ciphertext result; and
   decoding and decrypting the ciphertext result into a plaintext result,
   wherein the ciphertext result has a floating-point homomorphic encryption data structure, and the floating-point homomorphic encryption data structure of the ciphertext result contains another ciphertext mantissa, another exponent parameter and another gain parameter, and the step of decoding and decrypting the ciphertext result into the plaintext result comprises: decrypting the another ciphertext mantissa into a plaintext mantissa; and dividing the plaintext mantissa by the another gain parameter to get a quotient, and multiplying the quotient by the another exponent parameter to obtain the plaintext result.

2. The privacy computing method based on the homomorphic encryption of claim 1, wherein the plaintext data comprises a real number with a decimal, and the step of encoding and encrypting the plaintext data into the ciphertext data comprises:
   multiplying the real number with the decimal by the gain parameter to get a product, and dividing the product by the exponent parameter to obtain the plaintext mantissa; and
   encrypting the plaintext mantissa into the ciphertext mantissa, wherein the ciphertext mantissa is an integer.

3. A privacy computing method based on a homomorphic encryption, comprising steps of:
   receiving a ciphertext data, wherein the ciphertext data has a floating-point homomorphic encryption data structure, the floating-point homomorphic encryption data structure of the ciphertext data includes a ciphertext mantissa, an exponent parameter and a gain parameter, the gain parameter sets a precision of a floating point corresponding to the ciphertext mantissa, the exponent parameter is adapted to multiplication or division;
   using an artificial intelligence model to perform operations on the ciphertext data to return a ciphertext result;
   after a training of the artificial intelligence model is completed, searching layers in the artificial intelligence model one by one for a value adapted to zero a weight of a neuron as a threshold value; and
   setting the weight of the neuron of the artificial intelligence model that is less than the threshold value to zero.

4. The privacy computing method based on the homomorphic encryption of claim 3, wherein the ciphertext data includes a first ciphertext data and a second ciphertext data, a floating-point homomorphic encryption data structure of the first ciphertext data includes a first ciphertext mantissa, the exponent parameter and the gain parameter, a floating-point homomorphic encryption data structure of the second ciphertext data includes a second ciphertext mantissa, the exponent parameter and the gain parameter, the operations performed on the ciphertext data by the artificial intelligence model comprises an addition, and the addition comprises:

when the exponent parameter of the first ciphertext data is equal to the exponent parameter of the second ciphertext data, adding the first ciphertext mantissa of the first ciphertext data and the second ciphertext mantissa of the second ciphertext data up, so as to obtain a third ciphertext mantissa of a third ciphertext data, wherein a floating-point homomorphic encryption data structure of the third ciphertext data comprises the third ciphertext mantissa, the exponent parameter and the gain parameter.

5. The privacy computing method based on the homomorphic encryption of claim 3, wherein the ciphertext data includes a first ciphertext data and a second ciphertext data, a floating-point homomorphic encryption data structure of the first ciphertext data includes a first ciphertext mantissa, a first exponent parameter and the gain parameter, a floating-point homomorphic encryption data structure of the second ciphertext data includes a second ciphertext mantissa, a second exponent parameter and the gain parameter, the operations performed on the ciphertext data by the artificial intelligence model comprises an addition, and the addition comprises:

when the first exponent parameter is different from the second exponent parameter, dividing the first exponent parameter by the second exponent parameter to obtain a multiplier, multiply the first ciphertext mantissa by the multiplier to obtain a new first ciphertext mantissa, and replacing the first exponent parameter of the first ciphertext data by the second exponent parameter; and adding the new first ciphertext mantissa of the first ciphertext data and the second ciphertext mantissa of the second ciphertext data up, so as to obtain a third ciphertext mantissa of a third ciphertext data, wherein a floating-point homomorphic encryption data structure of the third ciphertext data comprises the third ciphertext mantissa, the second exponent parameter and the gain parameter.

6. The privacy computing method based on the homomorphic encryption of claim 3, wherein the operations performed on the ciphertext data by the artificial intelligence model comprises a multiplication, and the multiplication comprises:

multiplying the exponent parameter of the ciphertext data by a multiplier to obtain a new exponent parameter of the ciphertext data.

7. The privacy computing method based on the homomorphic encryption of claim 3, wherein the operations performed on the ciphertext data by the artificial intelligence model comprises:

using a functional bootstrapping of the artificial intelligence model to remove a noise from the ciphertext mantissa and to perform a table lookup function to realize a nonlinear function.

8. The privacy computing method based on the homomorphic encryption of claim 3, further comprising:

after the training of the artificial intelligence model is completed, adjusting a content of a lookup table in the artificial intelligence model and an encoder of an extraction in a functional bootstrapping to avoid overflow during the operations.

* * * * *